Figure 1:
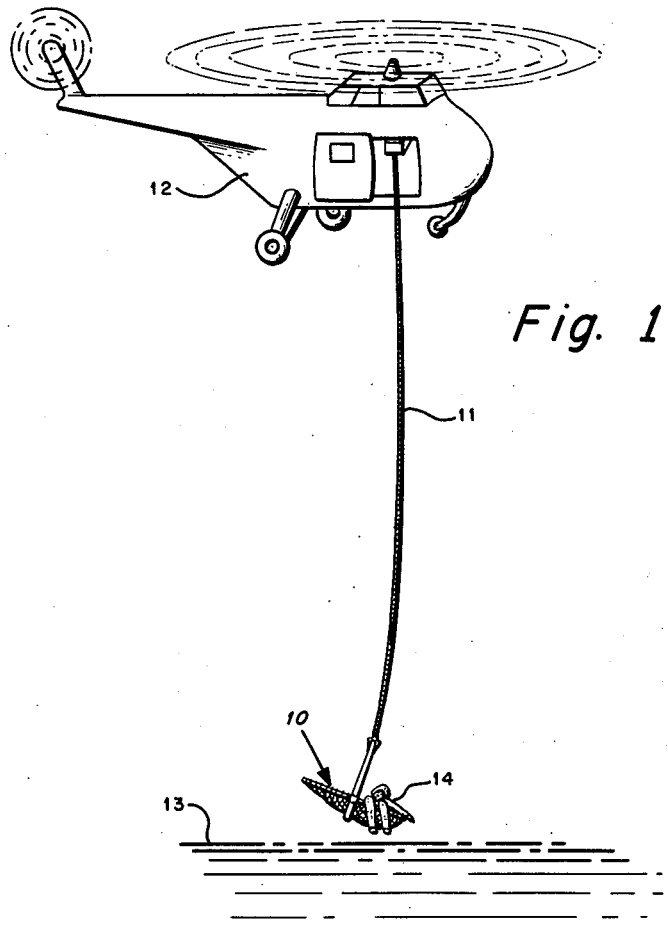

May 29, 1962   P. KARNOW   3,036,315
HELICOPTER OVER-WATER RESCUE DEVICE FOR IMMOBILE PERSONNEL
Filed Feb. 18, 1960   2 Sheets-Sheet 1

INVENTOR.
PAUL KARNOW
BY
AGENT

May 29, 1962 P. KARNOW 3,036,315
HELICOPTER OVER-WATER RESCUE DEVICE FOR IMMOBILE PERSONNEL
Filed Feb. 18, 1960 2 Sheets-Sheet 2
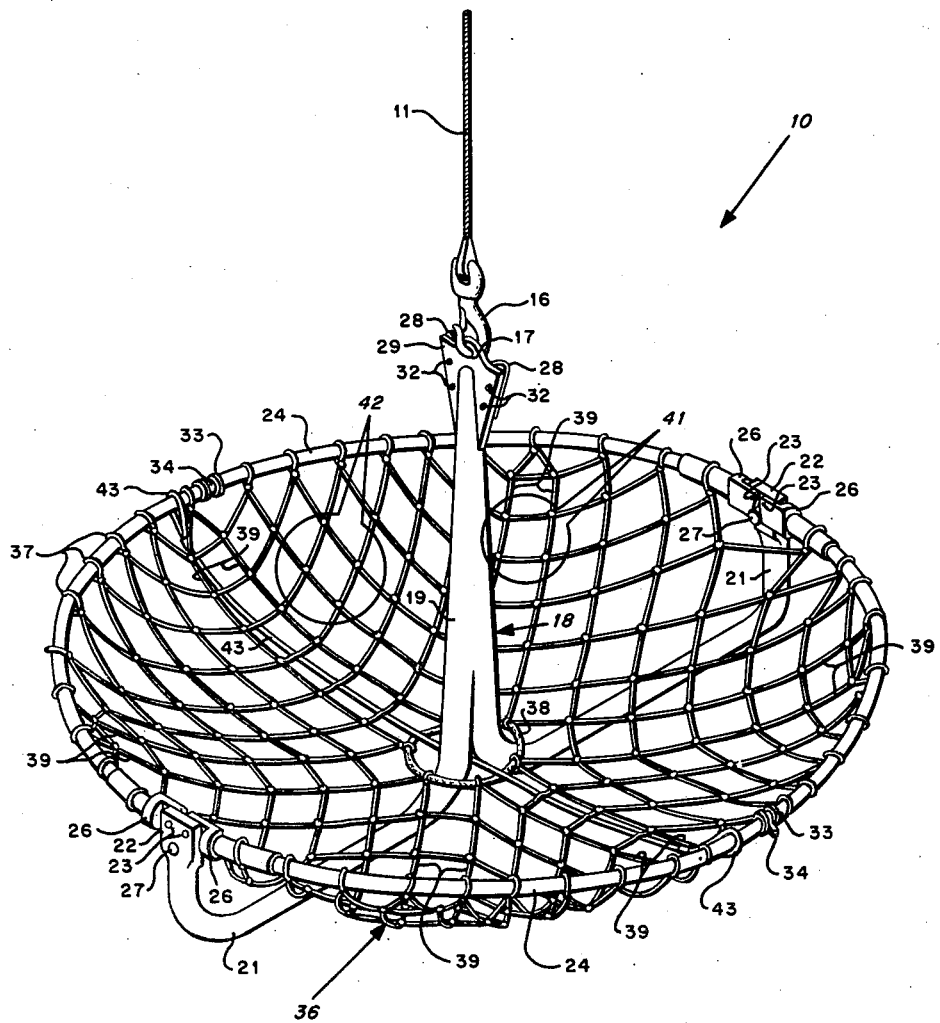
Fig. 2
INVENTOR.
PAUL KARNOW
BY 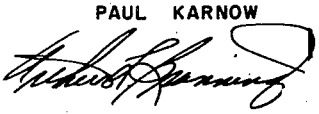
AGENT

United States Patent Office 3,036,315
Patented May 29, 1962

3,036,315
HELICOPTER OVER-WATER RESCUE DEVICE FOR IMMOBILE PERSONNEL
Paul Karnow, Philadelphia, Pa., assignor to the United States of America as represented by the Secretary of the Navy
Filed Feb. 18, 1960, Ser. No. 9,657
11 Claims. (Cl. 9—14)
(Granted under Title 35, U.S. Code (1952), sec. 266)

The invention described herein may be manufactured and used by or for the Goverment of the United States of America for governmental purposes without the payment of any royalties thereon or therefor.

This invention relates to a device for acquiring and retrieving objects from the water, and more particularly to a device for acquiring and retrieving immobile personnel primarily from the sea by a hovering aircraft.

Sea rescue missions which involve acquiring and retrieving personnel downed at sea by an aircraft, such as a helicopter, hovering above the water have often been unsuccessful where the person floating or submerged in the water has been immobilized by injury or unconsciousness. Speedy rescues were for the most part limited to those personnel who were able to assist in their own rescue. Prolonged exposure, injury or shock rendered many personnel incapable of engaging a lowered rescue device, and it was then necessary to lower a crewman from the aircraft into the water to secure the incapacitated person in the device before lifting him to the aircraft. There have been cases where both the lowered crewman and the downed personnel were lost in the rescue attempt.

Many rescue devices have been developed in an effort to obviate the need for lowering a crewman into the water. The principal objection to all of these devices is that they have obstructions above the device such as interfering suspension shrouds which thereby require careful orientation of the device with respect to the position of the immobile person in order to safely acquire and scoop him out of the water. Orientation usually was obtained by an extensible pole or by dragging a bridle-suspended net in the water and attaching a sea anchor, fins, or a float thereto for directional control. The extensible pole was unwieldy and often dangerous when used in a rough sea state and when the helicopter could not hover close enough to the person in distress. To orient the bridle-suspended net, it is necessary to drag it in the water. Orientation, however, was lost if the helicopter slowed down to hover over the person.

Acquiring and retrieving an immobilized person by these devices was uncertain and sometimes required frequent "passes and dips" thus prolonging the period of exposure of the person to the sea.

The general purpose of this invention is to provide a rescue device operable from an aircraft having hovering capability for quickly acquiring and retrieving a person from the water from any direction laterally disposed of said device. The device embraces all the advantages of similarly employed rescue devices and possesses none of the aforementioned disadvantages. To attain this result, the present invention contemplates a novel rescue device which is adapted to be carried in and operated from any aircraft having hovering capability, to be lowered into the sea alongside a person, to be brought against the person without regard to lateral orientation of the rescue device, and to be lifted to the aircraft, all within a short duration.

It will be noted that the device of the present invention contemplates only a few parts of simple design whereby a greatly improved result is produced with a less number of components than are essential in the prior art devices. Furthermore, no adverse effects are produced as a result of the new and simplified arrangement.

It is an object of the present invention to provide an improved rescue device completely operable from an aircraft hovering over water for quickly acquiring and retrieving a person from the water irrespective of weather and sea conditions.

Another object of the invention is to provide a novel rescue device capable of acquiring a person in water from any direction which is laterally disposed of the rescue device.

Another object is directed to providing a novel rescue device for quickly and positively acquiring and retrieving immobile personnel.

A further object is the provision of a foldable rescue device capable of being compactly stowed away in an aircraft when the rescue device is not in use.

Still another object of the invention is to provide an improved rescue device having economical, simple and light construction.

Figure 3:
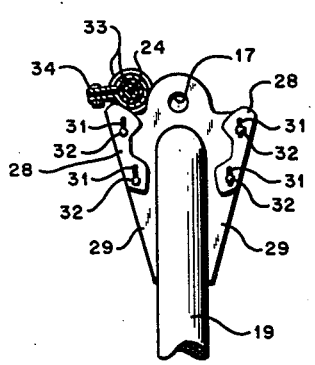

These and other objects and many of the attendant advantages of the present invention will be more readily appreciated as the same become better understood by reference to the following detailed description when considered in connection with the accompanying drawing, wherein:

FIG. 1 pictorially illustrates an elevational view of the rescue device in operation;

FIG. 2 represents, in an isometric view and in more detail, the rescue device shown in FIG. 1 in the operative position; and FIG. 3 is an enlarged view of the upper portion of the frame of the rescue device.

Referring to the drawings, wherein like reference characters designate like or corresponding parts throughout the several views, there is shown in FIG. 1 a rescue device 10 suspended by a hoisting cable 11 from a hovering helicopter 12 above the sea 13. The hoisting cable 11 is connected at one end to a hoisting apparatus, not shown, located in the helicopter 12. An immobile person 14 is shown acquired in the rescue device 10 and ready for safe lifting to the helicopter 12 from the sea 13.

As best seen in FIG. 2, the other end of cable 11 has a snap-on type hook 16 rotatably secured thereto and which is selectively connected to the rescue device 10 through lug 17. The main supporting structure of the rescue device 10 is constituted by an inverted T-frame 18 consisting of a vertical stem 19 and cantilevers or branches 21. Any suitable construction for the T-frame 18 may be used, however, in the preferred embodiment shown, two tubular L-frames of lightweight metal such as aluminum alloy are welded together back-to-back to form a water-tight hollow structure. The lug 17 defines the upper terminal of the stem 19. The branches 21 extend outwardly from the stem 19 and in opposite directions. The outer portions of each of the branches 21 extend generally upwardly. The amounts of outward and upward extension of the branches 21 are sufficient to assure quick and positive acquisition of the person to be retrieved.

Each tubular branch 21 terminates in a flattened section 22 having a pair of wrist pins 23 press-fitted therein. One pin 23 of each pair are pivotally connected to end fitting plates 26 which are welded to the ends of tubular rims 24, also preferably fabricated of watertight aluminum alloy tubing. The rims 24 are arcuate whereby an enclosed configuration is formed when the rims 24 are pivoted about pins 23 until the members 24 lie in the same plane, as shown in the drawing. In the specific embodiment illustrated, rims 24 are semicircular half-hoops which form a generally circular configuration when rotated into a single plane perpendicular to the vertical stem 19.

A boss 27 is fixed to each flattened section 22 for abutting each pair of plates 26 when the rims 24 are pivoted about the pins 3 into the plane perpendicular to the vertical stem 19 and thus into an open or operative position.

When the rescue device 10 is not in use, the rims 24 are pivoted about pins 23 until they snap over detents 28 connected on ears 29 at the upper terminal of stem 19 and thus assume a folded or non-operative position. As best seen in FIG. 3, the detents 28 are adjustable by means of slotted holes 31 in the detents 28 and nuts 32 in the ears 29. A spool 33 of elastic material such as rubber is secured on each rim 24 by a band clamp 34. The spools 33 are positioned on the rims 24 to contact the detents 28 and take up wear imparted by the detents 28.

A circular net 36, preferably fabricated of water-resistant nylon, is connected to rims 24 by means of evenly distributed loops 37 at the periphery of net 36. The spools 33 also act to prevent the adjacent loops 37 from intruding into the region confronted by detents 28. The net is woven of one continuous line using non-slipping hitches thereby reducing maintenance problems and preserving uniformity of mesh size. A heavy-braided, water-resistant nylon ring 38 defines an inner hole in the net 36 through which stem 19 extends. The circumference of ring 38 is sufficient to permit the net 36 to flex when a load is acquired therein. The efficiency of the net 36 is largely determined by its ability to distribute a load acquired therein over as many lines in the net 36 as possible. For the circular configuration illustrated, this is accomplished by six pairs of lines 39 radiating from the ring 38 to the periphery of net 36 and forming six radial rows of square-shaped meshes 41 therebetween. The pie-shaped spaces between the rows of square meshes 41 are tesselated with fields of diamond-shaped meshes 42. Obviously, other mesh patterns may be required for other rim configurations. The net 36 is constructed of a size adequate to assure that the center of gravity of the person 14 will rest below the lowest portion of rims 24 when completely suspended in the air.

A torn or damaged net 36 can be replaced simply by detaching the rims 24 from the pins 23, sliding the loops 37 off the rims 24, sliding a new net on the rims 24, and attaching the rims 24 back on the pins 23.

An elastic cord 43 such as Bungee line is connected at each end to the approximate mid-points of rims 24 and passes under the T-frame 18. The cord 43 is stretched when the device 10 is in the folded position and urges the rims 24 toward the open or operative position but the rims 24 are restrained by detents 28. The weight of each rim 24 is sufficient to maintain the device 10 fully open under normal conditions and the cord 43 remains slack to the same degree as the net 36. However, to restrain the net 36 from unnecessarily billowing upward, the cord 43 passes over top of the ring 38.

When the rescue device 10 is suspended in the air in the open or operative position and contains the person 14, the slack and elasticity of the net 36 and cord 43 are such that the weight of the person 14 acquired will cause his center of gravity to be substantially below the lowest point of rims 24. It is thus assured that the person 14 so acquired cannot spill out.

The operation of the rescue device 10 will now be summarized. The net is usually stowed in the helicopter 12 in the folded or non-operative position with the rims 24 engaged in detents 28. Commencing a rescue mission at sea from the helicopter 12 hovering above a downed person 14, a crewman will quickly attach the cable 11 to the lug 17 of the rescue device 10 by means of snap-on hook 16, push the device 10 out through an open hatch in the helicopter 12, and manually disengage the rims 24 from the detents 28. The elastic cord 43 will snap the rims 24 into the open or operative position. The device 10 then is simply dropped into the sea 13 at a point conveniently near the person 14. Whether the person 14 is floating on the surface or is submerged, the net is lowered to whatever depth is necessary to permit the rims 24 to pass under the person 14. The vertical stem 19 or cable 11 is brought against a suitable part of the person 14, preferably his torso, and the hoist is actuated to raise the device 10. When the stem 19 is against a heavy portion of the person 14, the device 10 positively acquires him and he can be safely lifted into the helicopter.

It is thus made possible to rescue any person, whether or not he is capable of assisting in his own rescue, without endangering the lives of the rescuers. With the rescue device of this invention, a rescue mission can now be accomplished with great haste and without the need of a highly skilled rescue team.

It should be understood that the foregoing disclosure relates only to a preferred embodiment of the invention and that numerous modifications and variations may be made therein without departing from the spirit and scope of the invention as set forth in the amended claims.

What is claimed is:

1. A rescue device for acquiring and retrieving personnel from water by use of an aircraft capable of hovering in air, comprising: a T-frame formed of a stem along a longitudinal axis and terminating at one end with two radially and oppositely extending branches, an outboard portion of each of said branches further extending approximately parallel to said longitudinal axis and toward the other end of said stem, two rims, each rim respectively hinged by pins at the opposite ends thereof to the opposite outboard terminals of said branches, said pins arranged to form a hinging axis for each of said rims perpendicular to and virtually passing through said longitudinal axis, a boss fixed to each of the outboard terminals of said branches for abutting said rims when said rims are rotated into a plane perpendicular to said longitudinal axis hence constituting an operative position, said rims when in said operative position forming a continuous perimeter, two detents adjustably attached to the other end of said stem yieldably securing said rims when said rims are rotated into a plane virtually coinciding with said longitudinal axis hence constituting a folded position, a spool means attached intermediate of the opposite ends of each of said rims for buffering the contact of each of said detents against each of said rims, an elastic cord connected at each end thereof to each of said rims and passing over said one end of said stem for urging said rims toward the operative position when said rims are substantially in the folded position, a flexible net peripherally defined by loops evenly distributed about the circumference of said net and having a flexible ring at its center for passing over said stem and a plurality of rows of square-shaped meshes equally spaced and radially extending from said ring to the circumference of said net, alternate fields of diamond-shaped meshes interconnecting said rows, said loops being connected to said rims whereby said ring passes around said stem and said net encloses the area within said perimeter, said cord passing by said ring in a manner for retaining said net at said one end of said stem when said rims are in the operative position, and a lug secured at said other end of said stem adapted to be attached to a hook and a hoisting cable for lifting said device into the aircraft.

2. A rescue device for acquiring and retrieving personnel from water by use of an aircraft capable of hovering in air, comprising: a rigid inverted T-frame having a stem and two oppositely extending cantilevers, a rim means supported at the terminals of said cantilevers defining a continuous perimeter, a net connected to said rim for enclosing the area within said perimeter, and lug means adapted to be connected to a hook and cable means for lifting said device to the aircraft.

3. A device as set forth in claim 2 including hinge means connected at the terminals of said cantilevers for rotating said rim means into a folded position against said stem.

4. A device as set forth in claim 3 including a detent means for retaining said rim means in the folded position against said stem.

5. A device as set forth in claim 3 including an elastic means for urging said rim means from the folded position toward an operative position.

6. In an apparatus operable from a helicopter for quickly acquiring a person in water from any direction laterally disposed of said apparatus, a net, a rigid rim connected to the periphery of said net, a rigid T-frame connected at its lateral terminals to opposite sides of said rim, and means connected at the outer terminal of the stem of said T-frame for hoisting said apparatus to the helicopter.

7. A rescue device for acquiring and retrieving personnel from water by use of an aircraft capable of hovering in air, comprising: a rigid elongated member normally suspended vertically and bifurcated at its lower end and adapted to be connected to hoisting means on its upper end, the branches of said bifurcated end oppositely and laterally extending from each other forming thereby two cantilevers and having an end portion of each branch extending upwardly, a continuous rim disposed about said elongated member and connected at opposite sides thereof to the terminal ends of the branches, and a net connected about its periphery to said rim and disposed on the upper side of the branches for enclosing the area within said rim.

8. Apparatus for rescuing personnel found at sea, comprising, in combination: a helicopter having an opening adapted to dispatch and receive a rescue device; a hoisting cable in said helicopter; said rescue device being connected to one end of said cable and consisting of a rigid inverted T-frame; a rim supported on opposite sides thereof at the lateral terminals of said T-frame and forming a continuous perimeter thereby, and a net peripherally secured to said rim for enclosing the area within said perimeter; said T-frame further comprising a stem, two oppositely extending cantilevers at one end of said stem; an outboard portion of said cantilevers further extending parallel to said stem and toward the other end of said stem; said rim comprising two arcuated members hinged by pins at the opposite end to the opposite outboard terminal of said cantilevers, said pins arranged to form a hinging axis for each of said members perpendicular to and virtually passing through said stem, and a boss fixed to each of the outward terminals of said branches for restricting rotation of said members about said pins.

9. Apparatus for rescuing personnel found at sea comprising, in combination: a helicopter having an opening adapted to dispatch and receive a rescue device; a hoisting cable in said helicopter; said rescue device being connected to one end of said cable and consisting of a rigid inverted T-frame; a rim supported on opposite sides thereof at the lateral terminals of said T-frame and forming a continuous perimeter thereby, and a net peripherally secured to said rim for enclosing the area within said perimeter; said net further comprising loops evenly distributed about its circumference of said net; a flexible ring at its center for passing over said stem; a plurality of rows of square-shaped meshes equally spaced and radially extending from said rim to the circumference of said net; and alternate fields of diamond-shaped meshes interconnecting said columns; and said net secured to said members whereby said ring passes around said stem and said net encloses the area within said perimeter.

10. Apparatus for rescuing personnel found at sea comprising, in combination: a helicopter having an opening adapted to dispatch and receive a rescue device; a hoisting cable in said helicopter, said rescue device being connected to one end of said cable and consisting of a rigid inverted T-frame, a rim supported on opposite sides thereof at the lateral terminals of said T-frame and forming a continuous perimeter thereby, and a net peripherally secured to said rim for enclosing the area within said perimeter, and including means connected at the lateral terminals of said T-frame for rotating said rim into a folded position when not in use.

11. Apparatus as set forth in claim 10 wherein said T-frame includes detent means fixed near the terminal of said T-frame for yieldably securing said rim in the folded position, spool means attached to said rim for buffering the contact of said rim against said detent means, and an elastic cord connected to said rim for urging said rim toward an operative position when said rim is substantially in the folded position.

References Cited in the file of this patent
UNITED STATES PATENTS

| | | |
|---|---|---|
| 551,468 | Hibbert | Dec. 17, 1895 |
| 1,053,608 | Keeper | Feb. 18, 1913 |
| 1,188,185 | Krulish | June 20, 1916 |
| 2,430,714 | Geer | Nov. 11, 1947 |
| 2,557,079 | Cutri | June 19, 1951 |
| 2,683,321 | Faber | July 13, 1954 |
| 2,738,939 | Johnson | Mar. 20, 1956 |
| 2,969,210 | Richardson et al. | Jan. 24, 1961 |

UNITED STATES PATENT OFFICE
CERTIFICATE OF CORRECTION

Patent No. 3,036,315                                                     May 29, 1962

Paul Karnow

It is hereby certified that error appears in the above numbered patent requiring correction and that the said Letters Patent should read as corrected below.

Column 3, line 5, for "pins 3" read -- pins 23 --; column 4, line 21, for "amended" read -- appended --; column 6, lines 8 and 9, for "withing" read -- within --; line 32, after "the" insert -- upper --.

Signed and sealed this 15th day of January 1963.

EAL)
test:

:NEST W. SWIDER                                          DAVID L. LADD
:esting Officer                                              Commissioner of Patents